N. G. THOMAS.
Cistern Strainers.

No. 138,594. Patented May 6, 1873.

Witnesses.
Stephen Edwards
L. T. Edwards.

Inventor.
N. G. Thomas

UNITED STATES PATENT OFFICE

NICHOLAS G. THOMAS, OF RINGGOLD, TENNESSEE.

IMPROVEMENT IN CISTERN-STRAINERS.

Specification forming part of Letters Patent No. 138,594, dated May 6, 1873; application filed March 13, 1871.

*To all whom it may concern:*

Be it known that I, N. G. THOMAS, of Ringgold, in the county of Montgomery and State of Tennessee, have invented a new and Improved Filter; and I do hereby declare that the following is a full, clear, and exact description of the same, reference being had to the accompanying drawing forming a part of this specification, in which—

Figure 1:
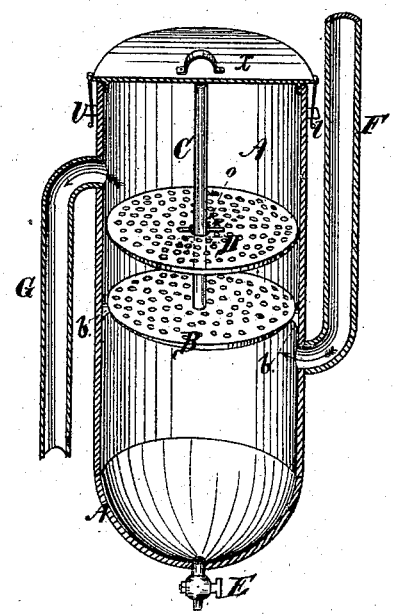
Figure 2:
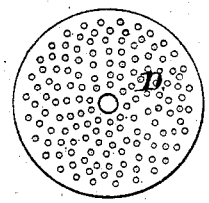
Figure 3:
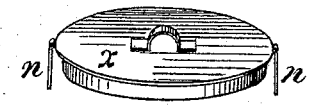

Figure 1 is mainly a sectional, but partly perspective, view of my improved filter. Fig. 2 is a plan view of one of the diaphragms. Fig. 3 is a perspective view of the cover.

My invention relates to the class of filters wherein perforated diaphragms are attached to a short central rod or stem, and the filtering substance is confined between them, the whole being inclosed and confined in a cylindrical case. The invention consists in the construction and arrangement of parts hereinafter described, whereby the cover of the case when closed serves to keep the diaphragms in place, and when removed allows the filtering apparatus proper to be taken out of the case.

In the drawing, A represents the cylindrical case having a conical bottom and a cock, E, for discharging sediment, &c. The cover X has hooks $n$ $n$ for engaging with catches $l$ $l$ on the sides of the case A, whereby it is secured in place. The inlet-pipe F and exit-pipe G connect with the case A, respectively, below and above the filtering apparatus proper. The latter is formed of two perforated disks, B and D, each attached to a rod or stem, C, passing centrally through them. The filtering material—charcoal or its equivalent—is to be placed between these disks or diaphragms. The lower disk B rests on lugs projecting inwardly from the side of the case A, and the stem C extends upward to the cover X. Thus the apparatus is rendered immovable upward or downward, by reason of either its own gravity or the force of the current of water through the filter.

The upper disk D may be readily removed from the stem C by withdrawing a pin, $a$, for the purpose of removing or cleansing the filtering substance, and the whole apparatus may be lifted out of the case by the rod C upon detaching or unfastening the cover.

Having thus described my invention, what I claim as new, and desire to secure by Letters Patent, is—

The combination of the diaphragms B D, lugs $b$ $b$, stem C, cover X, hooks $n$ $n$, and catches $l$ $l$, with the case A, as and for the purpose specified.

N. G. THOMAS.

Witnesses:
 STEPHEN EDWARDS,
 L. T. EDWARDS.